United States Patent
Hill et al.

(10) Patent No.: US 9,625,348 B2
(45) Date of Patent: Apr. 18, 2017

(54) FIBRE OPTIC ACOUSTIC SENSING

(75) Inventors: David John Hill, Weymouth (GB); Magnus McEwen-King, Farnham (GB)

(73) Assignee: Optasense Holdings Ltd. (GB)

( * ) Notice: Subject to any disclaimer, the term of this patent is extended or adjusted under 35 U.S.C. 154(b) by 269 days.

(21) Appl. No.: 13/059,810

(22) PCT Filed: Aug. 21, 2009

(86) PCT No.: PCT/GB2009/002055
§ 371 (c)(1),
(2), (4) Date: Feb. 18, 2011

(87) PCT Pub. No.: WO2010/020795
PCT Pub. Date: Feb. 25, 2010

(65) Prior Publication Data
US 2012/0137781 A1    Jun. 7, 2012

(30) Foreign Application Priority Data
Aug. 21, 2008 (GB) .................................. 0815297.7

(51) Int. Cl.
*G01N 21/00* (2006.01)
*G01M 3/24* (2006.01)
(Continued)

(52) U.S. Cl.
CPC ............... *G01M 3/243* (2013.01); *F17D 5/06* (2013.01); *G01D 5/48* (2013.01); *G01H 9/004* (2013.01); *G01M 3/047* (2013.01); *G01P 3/14* (2013.01)

(58) Field of Classification Search
CPC .................................................. G01H 9/004
(Continued)

(56) References Cited

U.S. PATENT DOCUMENTS 3,949,353 A * 4/1976 Waters et al. .................. 367/36
4,311,391 A   1/1982 Gilmour
(Continued)

FOREIGN PATENT DOCUMENTS

CN    2758749 Y    2/2006
CN    101231155 A  7/2008
(Continued)

OTHER PUBLICATIONS

Li, "Recent Applications of Fiber Optic Sensors to Health Monitoring in Civil Engineering", Engineering Structures, Butterworth, GB, vol. 26, No. 11, Sep. 1, 2004, pp. 1647-1657.
(Continued)

*Primary Examiner* — Kara E Geisel
*Assistant Examiner* — Rufus Phillips
(74) *Attorney, Agent, or Firm* — McDonnell Boehnen Hulbert & Berghoff LLP (57) ABSTRACT

This invention relates to the fiber optic distributed acoustic sensing to detect P and S waves in a solid medium. Distributed acoustic sensing can be achieved using an unmodified fiber optic by launching optical pulses into the fiber and detecting radiation which is Rayleigh backscattered there from. By analyzing the returns in analysis bins, acoustic disturbances can be detected in a plurality of discrete longitudinal sections of the fiber. The present invention extends such fiber distributed acoustic sensing to detection of S and P waves.

7 Claims, 4 Drawing Sheets (51) Int. Cl.
*F17D 5/06* (2006.01)
*G01D 5/48* (2006.01)
*G01H 9/00* (2006.01)
*G01P 3/14* (2006.01)
*G01M 3/04* (2006.01)

(58) Field of Classification Search
USPC .............. 356/73.1; 398/17–29; 73/645–648; 33/73.1
See application file for complete search history.

(56) References Cited

U.S. PATENT DOCUMENTS

| | | | |
|---|---|---|---|
| 4,313,185 A | 1/1982 | Chovan | |
| 4,363,114 A | 12/1982 | Bucaro et al. | |
| 4,590,799 A | 5/1986 | Brown et al. | |
| 4,747,309 A | 5/1988 | Weir | |
| 4,918,303 A * | 4/1990 | Gergely | 250/227.17 |
| 4,927,232 A | 5/1990 | Griffiths | |
| 5,417,112 A | 5/1995 | Rosenberg | |
| 6,211,964 B1 * | 4/2001 | Luscombe et al. | 356/477 |
| 6,731,570 B1 * | 5/2004 | Langdon | 367/149 |
| 6,847,207 B1 | 1/2005 | Veach et al. | |
| 6,993,977 B2 * | 2/2006 | Momayez et al. | 73/800 |
| 7,946,341 B2 | 5/2011 | Hartog et al. | |
| 8,020,616 B2 | 9/2011 | Greenaway | |
| 2003/0094281 A1 | 5/2003 | Tubel | |
| 2005/0034917 A1 * | 2/2005 | Mathiszik et al. | 181/108 |
| 2006/0028636 A1 | 2/2006 | Payton | |
| 2006/0165344 A1 | 7/2006 | Mendez et al. | |
| 2006/0188665 A1 | 8/2006 | Choi et al. | |
| 2006/0225507 A1 | 10/2006 | Paulson | |
| 2008/0088846 A1 | 4/2008 | Hayward | |
| 2008/0144016 A1 | 6/2008 | Lewis et al. | |

FOREIGN PATENT DOCUMENTS

| | | |
|---|---|---|
| EP | 1 912 049 | 4/2008 |
| EP | 1912050 | 4/2008 |
| GB | 2 442 647 | 4/2008 |
| JP | 08 233932 | 2/1995 |
| JP | 08 233564 | 9/1996 |
| JP | 2000 088561 | 3/2000 |
| WO | WO 2010/10318 | 1/2010 |

OTHER PUBLICATIONS

Hsu, et al., "Velocity Filtering of Acoustic Well Logging Waveforms", IEEE Transactions of Acoustics, Speech and Signal Processing, vol. 37, No. 2, Feb. 1989, pp. 265-274.

Nagano, et al., "Automatic Algorithm for Triaxial Hodogram Source Location in Downhole Acoustic Emission Measurement", Geophysics, vol. 54, No. 4, Apr. 1989, pp. 508-513.

Unpublished U.S. Appl. No. 13/059,795, filed Feb. 18, 2011 in the name of Hill et al., entitled: "Conduit Monitoring".

Preliminary Amendment filed in U.S. Appl. No. 13/059,795 on Feb. 18, 2011.

Unpublished U.S. Appl. No. 13/059,806, filed Feb. 18, 2011 in the name of Hill et al., entitled: "Tracking Objects in Conduits".

Preliminary Amendment filed in U.S. Appl. No. 13/059,806 on Feb. 18, 2011.

Non-Final Office Action issued in U.S. Appl. No. 13/059,806, mailed on Dec. 23, 2013.

Non-Final Office Action issued in U.S. Appl. No. 13/059,795, mailed on Jul. 1, 2013.

Reply to Non-Final Office Action in U.S. Appl. No. 13/059,795, filed Oct. 1, 2013.

* cited by examiner

FIBRE OPTIC ACOUSTIC SENSING

FIELD OF THE INVENTION

The present invention relates to fibre optic acoustic sensing, and more particularly to fibre optic distributed acoustic sensing.

BACKGROUND OF THE INVENTION

Various fibre optic based acoustic sensors are known. Many such sensors uses complex interferometry techniques and/or fibre optic point sensors or reflection sites arranged along the length of a fibre to provide acoustic sensing.

Recently the use of intrinsic scattering from a continuous length of fibre optic cable has been proposed, i.e. using a standard fibre optic cable without deliberately introduced reflection sites such a fibre Bragg grating or the like. GB patent application publication No. 2,442,745 describes a system wherein acoustic vibrations are sensed by launching a plurality of groups of pulse modulated electromagnetic waves into a standard optical fibre. The frequency of one pulse within a group differs from the frequency of another pulse in the group. The Rayleigh backscattering of light from intrinsic reflection sites within the fibre is sampled and demodulated at the frequency difference between the pulses in a group. N different analysis bins are used, each associated with a specific length of the fibre, and an acoustic disturbance in an individual analysis bin can be detected.

Use of such fibre distributed acoustic sensing systems has been proposed for perimeter monitoring or monitoring of oil or gas transmission pipelines. Generally however such acoustic systems are known for detecting an acoustic event in a particular analysis bin, for example for indicating that the perimeter being monitored has been crossed at a particular point.

It is an object of the present invention to provide new applications of fibre distributed acoustic sensing systems and methods and apparatus relating to fibre distributed acoustic sensing for use in such applications.

SUMMARY OF THE INVENTION

In a first aspect of the present invention there is provided a method of detecting P and S waves in a solid medium comprising: repetitively launching at least a first optical pulse and a second optical pulse into a optic fibre located; at least partly, within said solid medium wherein the first and second pulses have a first optical frequency difference; detecting light which is Raleigh backscattered from the optic fibre; analysing the backscattered light to determine a measure of disturbance for each of a plurality of discrete longitudinal sensing portions of the optic fibre, and analysing the evolution of a disturbance in the discrete longitudinal sensing portions to detect P and S waves.

This first aspect of the present invention therefore provides a method of detecting P and S waves propagating through a solid medium such as the ground or a structure formed from a material such as concrete or the like.

P and S waves represent different types of waves that can propagate through material depending on the nature of the stimulus. P waves, sometimes referred to as primary waves or pressure waves, are compressive waves that can travel through solids, liquids and gases. S waves, sometime referred to as secondary or shear waves, are transverse waves and only occur in solid material. Note as used herein the term solid is used purely to distinguish from liquids and gases and is not meant to imply some continuous material. The solid material may be an aggregate or colloidal mixture such as soil, sand, silt etc.

The method uses an optic fibre, which may for instance be an unmodified optic fibre such as would be used for telecommunications type applications, which is located at least partly within the solid medium, that is at least some of the fibre lies within the material. Conveniently all, or the majority, of the fibre is located with the medium.

The method involves distributed acoustic sensing. At least two optical pulses are launched into the optic fibre and Rayleigh backscattered radiation is detected. To ensure that the radiation is Rayleigh backscattered radiation the optical power of the pulses is kept below the non-linear threshold of the optic fibre, i.e. below the power threshold beyond which non-linear optical effects would occur. The detected radiation is analysed to determine a measure of disturbance for each of a plurality of discrete longitudinal sensing portions of the optic fibre. The determined disturbance is a measure of the mechanical vibration affecting the fibre at that particular portion of the fibre. The fibre in effect acts as a series of independent acoustic sensors distributed at regular interval along the length of the fibre.

As mentioned above distributed acoustic sensing is known for use in situations where it is desired to locate a particular acoustic event at a sensing portion of the fibre.

Generally however, in such known distributed acoustic sensing (DAS) systems, the processing looks for an acoustic event occurring within a sensing portion of the fibre that has an amplitude above a threshold.

The present invention lies partly in the realisation that a DAS system can provide sufficient information to allow for the detection of P and S waves travelling through a medium. A conventional DAS system is not concerned with the detection of both P and S waves. In a conventional DAS system the disturbance being monitored may be such that S waves are not generated with a large amplitude.

The method of this aspect of the present invention uses the evolution of disturbances detected by the DAS system to identify the P and S waves. P and S waves have different transmission properties through material and generally S waves are slower than P waves by a relative factor, although the absolute speeds depend on the exact material through which the waves propagate. Thus, if a remote event generates both P and S waves, the P wave will be incident before the S wave. This aspect of the present invention exploits this fact to allow for the detection and identification of P and S waves. For any given sensing portion of the optic fibre, a disturbance caused by the P waves will occur before a disturbance caused by the S wave. In conventional DAS systems any incident S waves, arriving shortly after the P waves, would be seen as part of the overall acoustic disturbance and would not be recognised as a distinct body wave The method may therefore comprise identifying a first series of disturbances in the plurality of discrete longitudinal sensing portions of the fibre followed by a second, related series of disturbances. In other words the method comprises detecting the disturbances caused by the P wave followed by the disturbances caused by the S wave. The second series of disturbances is related to the first series of disturbances in that substantially the same discrete longitudinal sensing portions experience the disturbance in substantially the same order in each of the first and second series. In other words if a P wave from a particular source impinges on the fibre it may cause a disturbance in various sections of the fibre in a particular sequence. For example imagine a linear fibre with a P wave incident from the side. In a first time period the P wave may impinge on a first sensing portion, with a resulting relatively large amplitude disturbance being detected at this point. In a following time period the P wave may reach the sections of fibre on either side of the first sensing portion. In subsequent time periods the wave may impinge on sections further and further away from the first section. At some point the S wave will arrive and impinge on the first section leading to another large disturbance at the first section. The S wave will then progressively impinge on the adjacent sections and then sections further away and hence a similar series of disturbances will occur. The present invention makes use of such a characteristic series of disturbances to identify P and S waves.

The simple example described above does not take account of variations in propagation speed that may apply to different part of the incident waves. For instance, for P and S waves travelling through the ground the type of rock or other material that the waves travel through will affect the propagation speed of the waves. Thus as some parts of the P wave say may travel through different material to other parts of the P wave the wavefront may have a more complex form that indicated above. Further it is possible the wavefront for the P waves differs from the wavefront of the S wave. However, generally substantially the same discreet sensing portions will be affected and in substantially the same order due to the P wave as due to the S wave. This aspect of the present invention therefore uses the detection of disturbances in several different discrete sensing portions to detect and identify a particular event, in this case incidence of the P and S waves.

As the S waves propagate slower than the P waves the second series of disturbances has a slower evolution than the first series of disturbances, i.e. the time difference between a disturbance being detected at one sensing portion and another remote sensing portion will be longer for the disturbance due to the S wave than for the disturbances due to the P wave. This change in the rate of evolution of the disturbances can also be used to identify disturbances due to P and S waves.

Clearly the number of sensing portions of the fibre which experience the disturbance due to the P and S waves will depend on the relative strength of the P and S waves when they reach the optic fibre and the spatial size of the sensing portions. The spatial size of the discrete sensing portion is defined by the pulses launched into the fibre. The minimum spatial size depends partly on the length of the fibre. The pulses are limited in power so as not to cause non-linear effects in the fibre and for a given pulse width there will be a maximum length beyond which backscattered radiation can not be reliably detected. The spatial size of the discrete sensing portions may less than or equal to 30 m in many embodiments, and less than or equal to 20 m or 10 m in certain embodiments. In certain embodiments the optic fibre is interrogated to provide sensed data over a distance greater than or equal to 20 km, and distances of greater than or equal to 30 km or 40 km are achievable in other embodiments.

The method may comprise analysing the evolution of the disturbance of discrete longitudinal sensing portions together with the location of each discrete longitudinal sensing portion to identify a first wavefront followed by a second, slower wavefront. In other words, if the relative locations of the discrete sensing portions are known, the actual wavefronts of the P and S waves can be determined. The P and S waves would generally be expected to have similar shaped wavefronts but they would progress at different propagation rates. The method may comprise the step of determining the degree of curvature of one or both of the first wavefront and the second wavefront. If the optic fibre is arranged in a rectilinear arrangement the relative location of the discrete sensing portions simply corresponds to the range to the relevant sensing portion. However other fibre arrangements are possible, such as a loop or curvilinear arrangement and in such a case the geometry of the fibre may be stored in a memory or look up table or the like.

The method may comprise the further step of analysing the detected P and S waves to determine the origin of the P and S waves. This aspect of the present invention therefore provides a method for detecting the location of the origin of an acoustic or seismic event by detecting and identifying P and S waves due to said event and then using said P and S waves to determine the location of the event.

The difference in time of arrival of the P and S waves at two or more different discrete longitudinal sensing portions may be used to determine the origin of the P and S waves. Although the absolute velocity depends on the material that the waves are propagating through, S waves generally propagate at a speed about 0.6 times the speed of the P waves. If there is a first time difference between detection of the P wave and subsequent detection of the S wave at a first discrete sensing portion and a second time difference between the times of arrival at the P and S waves at a second discrete portion, the ratio of the first and second time differences may be assumed to also be the ratio between the distances of the first and second sensing portions from the origin. By looking at the time differences from a number of different sensing portions the origin of the P and S waves may be determined. It should be noted however that if the fibre is substantially rectilinear the determination of origin may have some ambiguity associated with it. The method may also comprise using the shape of at least one of the first and second wavefronts to determine the origin of the P and S waves.

Whilst the method has been described in terms of interrogating the fibre and processing the acquired data the data need not be processed in real time or at the location of the optical source and detector. The data could be recorded for later analysis and/or transmitted to a remote location for processing.

In a second aspect of the present invention there is provided a method of processing distributed acoustic sensor data to detect P and S waves comprising the steps of: taking data corresponding to a plurality of measurements of detected light which is Raleigh backscattered following repetitively launching at least first and second optical pulses, having an optical frequency difference between them, into an optic fibre at least partly contained in a solid medium; analysing said data to determine a measure of disturbance for a each of a plurality of discrete longitudinal sensing portions of the optic fibre, and analysing the evolution of a disturbance in the discrete longitudinal sensing portions to detect P and S waves.

This method of processing may utilise all of the embodiments described above with respect to the first aspect of the invention and also benefits from all of the same advantages.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein. A suitably programmed computer may control and optical source and receive data from a suitable optical detector. The computer program may be embodied in a transmission signal.

The present invention also relates to an apparatus for detecting P and S waves. Thus in a further aspect of the invention there is provide an apparatus for detecting P and S waves in a solid medium comprising: an optic fibre located at least partly within said medium; an optical source configured to launch at least a first optical pulse and a second optical pulse into the optic fibre wherein the first and second pulses having a first optical frequency difference, the optical power of the pulses being below a non-linear threshold, an optical detector configured to detect Rayleigh backscattering from the optic fibre; and a processor configured to: analyse the backscattered light to determine a measure of disturbance for a plurality of discrete longitudinal sensing portions of the optic fibre; and analyse the evolution of a disturbance in the discrete longitudinal sensing portions to detect P and S waves.

The apparatus according to this aspect of the invention may comprise a processor adapted to perform the method of either the first or second aspects of the invention. The apparatus of this aspect of the invention offers all the same advantages and may be implemented to utilize any of the embodiments described above. In particular the processor may be arranged to determine the origin of the P and S waves relative to the optic fibre.

The optic fibre may be a continuous, unmodified optic fibre, such as a standard telecom fibre or the like. In other words the optic fibre is not provided with separate point sensors or specific reflection sites or the like.

In general the present invention relates to detection of P and S waves. Another aspect of the invention is the use of a fibre optic distributed acoustic sensor to detect and identify P and S waves in a solid medium. As mentioned above conventional fibre optic DAS has only been used to detect individual acoustic events and it has not been thought possible or preferable to attempt to detect P and S waves in a material using a DAS system. The distributed acoustic sensor is preferably one which uses an unmodified optic fibre to provide a plurality of independent acoustic channels using the techniques of optical time domain reflectometry.

The invention extends to methods, apparatus and/or use substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

DESCRIPTION OF THE DRAWINGS

Preferred features of the present invention will now be described, purely by way of example, with reference to the accompanying drawings, in which.

DESCRIPTION OF THE INVENTION

Figure 1:
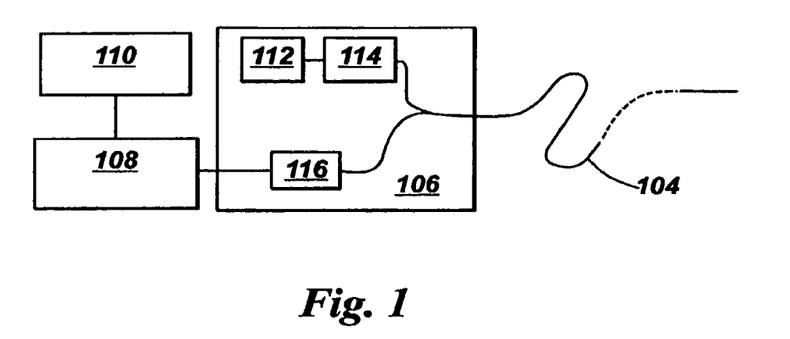
FIG. 1 illustrates the basic components of a distributed fibre optic sensor.

FIG. 1 shows a schematic of a distributed fibre optic sensing arrangement. A length of sensing fibre 104 is connected at one end to an interrogator 106. The output from interrogator 106 is passed to a signal processor 108 and optionally a user interface 110, which in practice may be realised by an appropriately specified PC.

Figure 2A:
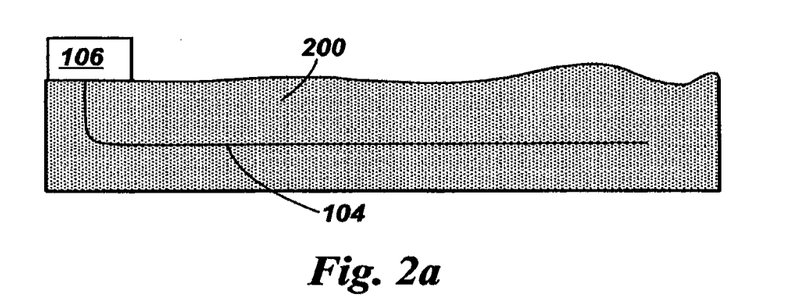
FIG. 2a shows a distributed acoustic sensor system buried in the ground.
Figure 2B:
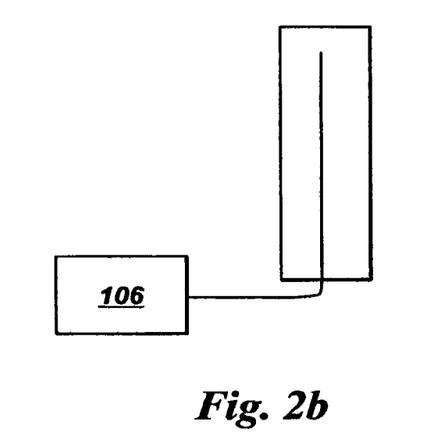
FIG. 2b shows a distributed acoustic sensor system encased in a structure.

The sensing fibre 104 can be many kilometers in length, and in this example is approximately 40 km long. The sensing fibre is conveniently a standard, unmodified optic fibre such as a single mode optic fibre used in telecommunications applications. In use the sensing fibre is at least partly contained within a medium which it is wished to monitor. For example, the fibre 104 may be buried in the ground 200, as shown in FIG. 2a, to provide monitoring of a perimeter or monitoring of a buried asset such as a pipeline or the like; The fibre could be encased at least partly within part of a structure 202 as shown in FIG. 2b to provide structural monitoring.

In operation the interrogator 106 launches an interrogating optical signal, which may for example comprise a series of pulses having a selected frequency pattern, into the sensing fibre. The optical pulses may have a frequency pattern as described in GB patent publication GB2,442,745 the contents of which are hereby incorporated by reference thereto. As described in GB2,442,745 the phenomenon of Rayleigh backscattering results in some fraction of the light input into the fibre being reflected back to the interrogator, where it is detected to provide an output signal which is representative of acoustic disturbances in the vicinity of the fibre. The interrogator therefore conveniently comprises at least one laser 112 and at least one optical modulator 114 for producing a plurality of optical pulse separated by a known optical frequency difference. The interrogator also comprises at least one photodetector 116 arranged to detect radiation which is backscattered from the intrinsic scattering sites within the fibre 104.

The signal from the photodetector is processed by signal processor 108. The signal processor conveniently demodulates the returned signal based on the frequency difference between the optical pulses such as described in GB2,442,745. The signal processor may also apply a phase unwrap algorithm as described in GB2,442,745.

The form of the optical input and the method of detection allow a single continuous fibre to be spatially resolved into discrete sensing lengths. That is, the acoustic signal sensed at one sensing length can be provided substantially independently of the sensed signal at an adjacent length. The spatial resolution in the present example is approximately 10 m, resulting in the output of the interrogator taking the form of 4000 independent data channels.

In this way, the single sensing fibre can provide sensed data which is analogous to a multiplexed array of adjacent independent sensors, arranged in a linear path.

In one embodiment of the present invention the signal processor 108 is configured to analyse the data collected to detect P and S waves.

As the skilled person will appreciate P and S waves are different types of body waves that can occur within a medium. For example seismic waves, such as generated by significant shocks to the ground or a body, may comprise P and S waves. P waves, often called primary or pressure waves, are longitudinal or compressive waves that propagate by compressing material in the direction of travel of the wave. P waves can travel through solids as well as gases and liquids. S waves, often called secondary or shear waves, are transverse waves that can propagate through solid materials only.

P and S waves travel at different speeds through material with the S waves having a propagation speed about 0.6 times that of the P wave in any given medium. Although the absolute speed of propagation depends on the medium the relative speed remains roughly constant in most materials. Thus, from any remote event that generates both P and S waves, the P waves will arrive first.

The present inventors have discovered that a fibre optic distributed acoustic sensor as described above is able to detect the effects of both incident P waves and S waves and that the arrival of the P and S waves can be separately detected. Further the time of arrival difference between the P and S waves can be exploited not only to detect and identify the P and S waves but also this can be used to estimate the direction of origin and P and S waves and also the range to the origin.

Given that P waves travel faster than S waves the P waves will be incident on the optic fibre first. The passage of the P wave will vibrate the various sections of fibre which will be detected as an acoustic disturbance. Typically the P wave will have a curved wavefront and so, depending on fibre geometry, will be incident on different sections of the fibre at different times. Imagine a linear fibre with a P wave incident from the side. The wavefront will first encounter the fibre at some position X and hence the sensing portion of fibre corresponding to position X will be the first to experience a disturbance due to the P wave. As time progresses the wavefront will reach the sections progressively further away from position X.

Figure 3:
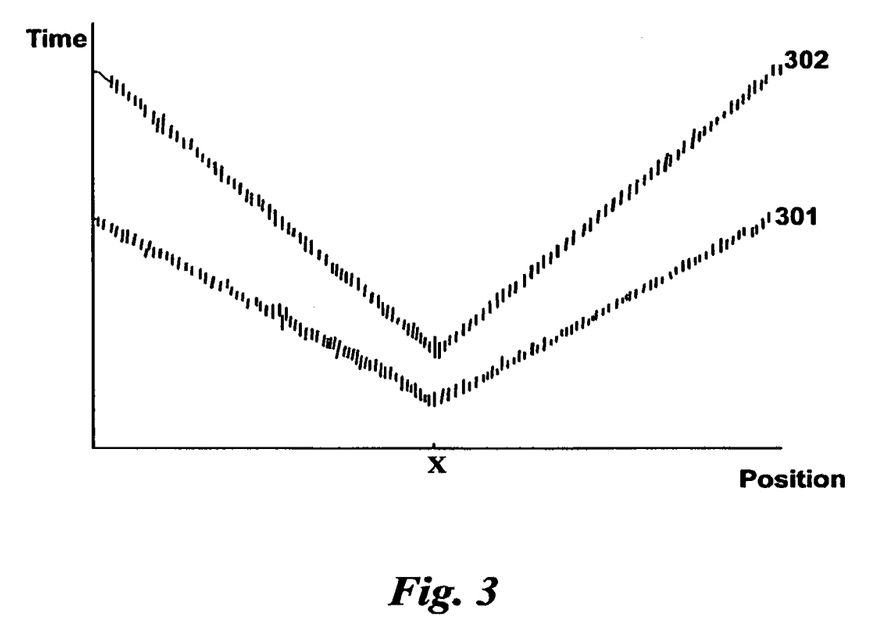
FIG. 3 shows an idealised plot of disturbances detected by a distributed acoustic sensor due to incidence of P and S waves.

FIG. 3 shows an idealised response of a distributed acoustic fibre. The x-axis of FIG. 3 shows position along the fibre and the y-axis shows time. Trace 301 illustrates the idealised response to an incident p wave. An acoustic disturbances is first registered at position X and as time goes on the disturbances reaches other sections of the fibre.

The S wave will follow after the P wave. As the P and S waves generally share a common origin the S wave will again likely be incident on the fibre at position X first. A similar response will therefore be seen. A disturbances at position X first followed later by disturbances along the fibre spreading out from position X. As the S wave has a slower propagation however the evolution of the disturbances will be slower. This is illustrated in FIG. 3 by the fact that the slope of the trace 302 due to the S wave has a steeper gradient.

Figure 4A:
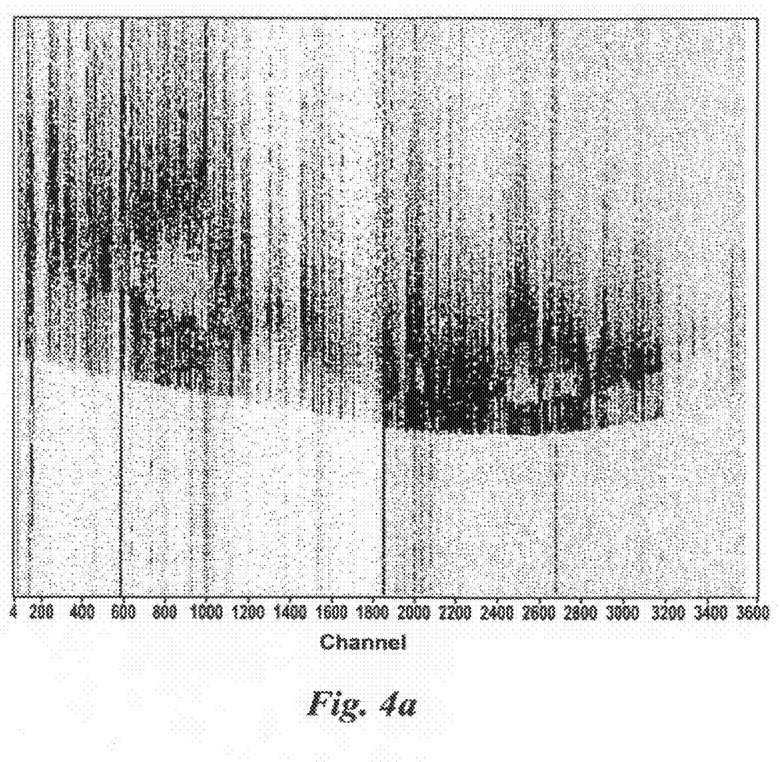
FIGS. 4a and 4b show data from obtained from a distributed acoustic sensor system.
Figure 4B:
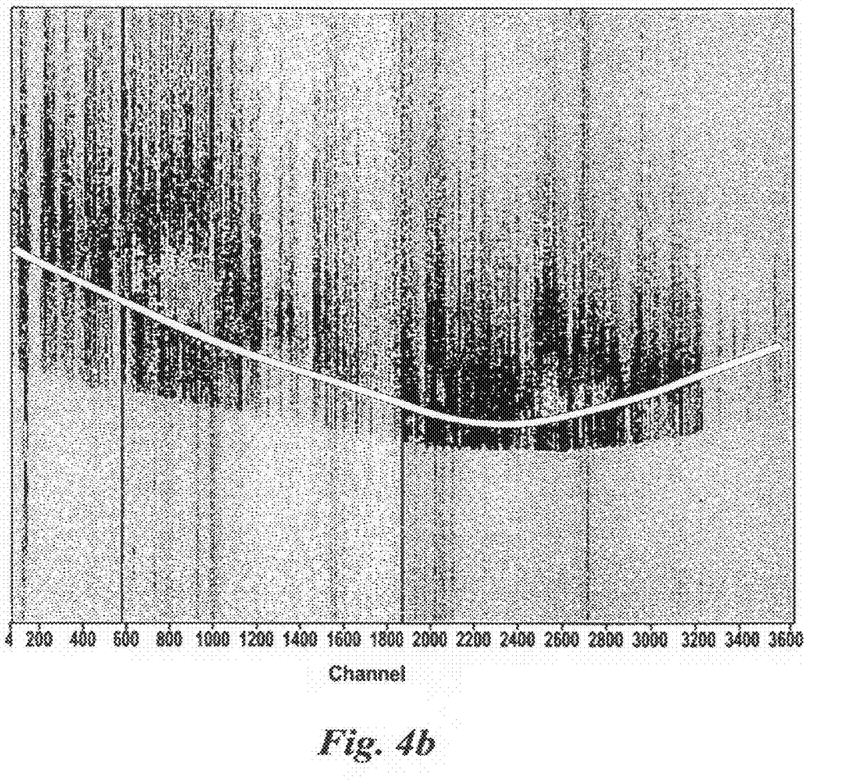

FIGS. 4a and 4b show an actual plot of signal returns from a distributed acoustic fibre. FIGS. 4a and 4b show the same data but in FIG. 4b the returns due to the S wave are highlighted. Both FIGS. 4a and 4b show waterfall plots where time is plotted on the y-axis, distance along the fibre on the x-axis and acoustic amplitude is illustrated by the intensity of the data point. It can be seen from FIG. 4a that the incidence of the P wave can be clearly distinguished as a first series of disturbances that initial are detected at channels around 2400. As, in this instance each channel represents a 10m section of fibre, this corresponds to a distance of about 24 km along the fibre length. The disturbance then spreads to the neighbouring channels as time progresses. It can be seen from the left hand side of the plot that the onset of the disturbances follows a line of roughly constant gradient.

The S wave arrives whilst the P wave effects are still evident, which illustrates the difficult in distinguishing the effects of P and S waves. However the S wave can be made out as a variation in intensity that affects several channels of the sensor over time. Unfortunately this doesn't come out as clearly in the black and white FIGS. 4a and 4b. Nevertheless a second series of disturbances can be made out and this secondary wavefront arriving has been highlighted in FIG. 4b. It can be seen from these figures that the S wave has the same general point of incidence on the fibre and spreads in generally the same manner as the P wave, but that the slope of the S wave is steeper, indicating a slower propagation.

The signal processor is therefore adapted to detect P and S waves by detecting a first series of acoustic disturbances affecting the channels of the fibre in a particular order followed a short time later by a second series of acoustic disturbances affecting substantially the same channels of the fibre and in substantially the same order but with a slower time evolution, i.e. the second series of disturbances spreads more slowly. It will be clear from FIGS. 4a and 4b that the due to the P wave the S wave arrives in a period of increased acoustic activity and thus the second series of acoustic disturbances represents a series of changes in acoustic amplitude. With knowledge of the characteristic response to incidence of P and S waves the distinct P and S waves can be identified through appropriate signal processing.

Once the S and P waves have been identified, the arrival times at various locations of the fibre can be used to determine the direction and/or range of the origin of the P and S waves relative to the fibre. The wavefronts for either or both of the P and S waves may be determined and used to give an indication of the point origin based on the curvature of the wavefront and any prior knowledge about the medium through which the waves have travelled.

Additionally or alternatively the relative time of arrival of the P and S waves may be used to determine a direction and/or range to the origin. This exploits the fact that the P and S waves have a relative speed that is approximately constant. Thus if the time difference between arrival of the P wave and subsequent arrival of the S wave at a first position on the fibre is $T_1$ and the time different between arrival of the P wave and subsequent arrival of the S wave at a second position on the fibre is $T_2$ it can be assumed that the ratio of the distance of the first position to the origin to the distance of the second position to the origin is $T_1:T_2$. By looking at the relative time differences at several positions along the fibre the relative position of the origin can be estimated. The actual time difference of arrival of the P and S waves can also be used, with an estimate of speed of propagation to estimate the point of origin.

The present invention therefore relates to the use of fibre optic sensing to detect P and S waves propagating in solids and to DAS systems arranged to detect P and S waves and use the detection of P and S waves to determine the origin thereof.

It will be noted that each feature disclosed in the description, and (where appropriate) the claims and drawings may be provided independently or in any appropriate combination.

The invention claimed is:

1. A method of detecting P and S waves in a solid medium comprising:
    repetitively launching at least a first optical pulse and a second optical pulse into a optic fibre located, at least partly, within said solid medium wherein the first and second pulses have a first optical frequency difference;

detecting light which is Raleigh backscattered from the optic fibre;

analysing the backscattered light to determine a measure of disturbance for each of a plurality of discrete longitudinal sensing portions of the optic fibre, analysing the evolution of a disturbance in the discrete longitudinal sensing portions together with the location of each discrete longitudinal sensing portion to identify a first wavefront followed by a second, slower wavefront to detect P and S waves, and analysing the detected P and S waves to determine their origin using the differences in time of arrival of the P and S waves at two or more different discrete longitudinal sensing portions by the further steps of:

determining a first time difference between times of arrival of the P wave and the S wave at a first discrete sensing portion, determining a second time difference between the times of arrival of the P wave and the S wave at a second discrete portion, and determining a ratio of the first and second time differences, wherein said determined ratio is assumed to be the ratio between the distances of the first and second sensing portions from the origin.

2. A method as claimed in claim 1 wherein analysing the evolution of a disturbance in the discrete longitudinal sensing portions comprises identifying a first series of disturbances in the plurality of discrete longitudinal sensing portions followed by a second related series of disturbances.

3. A method as claimed in claim 2 wherein the second series of disturbances is related to the first series of disturbances by affecting substantially the same discrete longitudinal sensing portions in substantially the same order.

4. A method as claimed in claim 3 wherein the second series of disturbances has a slower propagation then the first series of disturbances.

5. A method as claimed in claim 1 comprising the step of determining the degree of curvature of one or both of the first wavefront and the second wavefront.

6. A method as claimed in claim 1, wherein the shape of at least one of the first and second wavefronts is used to determine the origin of the P and S waves.

7. A computer program which, when run on a suitable computer, performs the method as claimed in claim 1.

* * * * *